US009839318B2

(12) United States Patent
Lagerlöf (10) Patent No.: US 9,839,318 B2
(45) Date of Patent: Dec. 12, 2017

(54) FOOD COOKING DEVICE, AN ELECTRONIC LIBRARY AND METHODS RELATED THERETO

(71) Applicant: BBBL INNOVATION AB, Stockholm (SE)

(72) Inventor: Johan Lagerlöf, Bromma (SE)

(73) Assignee: BBBL INNOVATION AB, Stockholm (SE)

( * ) Notice: Subject to any disclaimer, the term of this patent is extended or adjusted under 35 U.S.C. 154(b) by 0 days.

(21) Appl. No.: 14/405,259

(22) PCT Filed: Apr. 23, 2013

(86) PCT No.: PCT/SE2013/050435
§ 371 (c)(1),
(2) Date: Dec. 3, 2014

(87) PCT Pub. No.: WO2013/184058
PCT Pub. Date: Dec. 12, 2013

(65) Prior Publication Data
US 2015/0147441 A1    May 28, 2015

(30) Foreign Application Priority Data
Jun. 4, 2012 (SE) ...................... 1250577

(51) Int. Cl.
*A47J 27/62*    (2006.01)
*H05B 1/02*    (2006.01)
(Continued)

(52) U.S. Cl.
CPC ............. *A47J 27/004* (2013.01); *A47J 27/62* (2013.01); *F24C 7/08* (2013.01); *G05B 15/02* (2013.01); *H04L 67/10* (2013.01)

(58) Field of Classification Search
CPC .. B23K 9/10; G09B 19/24; F24C 7/08; G05D 23/19; G06F 3/016; A47J 27/004; A47J 24/62
(Continued)

(56) References Cited

U.S. PATENT DOCUMENTS 4,914,277 A    4/1990  Guerin et al.
2007/0158335 A1    7/2007  Mansbery
(Continued)

FOREIGN PATENT DOCUMENTS

DE    200 22 823    5/2002
EP    0780081 A1    6/1997
(Continued)

OTHER PUBLICATIONS

International Preliminary Report on Patentability regarding International Application No. PCT/SE2013/050435, dated Jun. 12, 2014, 10 pages.
(Continued)

*Primary Examiner* — Brian Jennison
(74) *Attorney, Agent, or Firm* — Foley & Lardner LLP (57) ABSTRACT

The invention relates to a food cooking device (300) having a plurality of heating means (301 *a*-301 *d*) for heating a respective food item. The device is provided with control means (302) arranged to individually control energy supply to each of the heating means (301 *a*-301 *d*). According to the invention the device (300) includes a microprocessor (303) with downloading means (304) arranged to download a set of food cooking process data. The control means (302) is arranged to control the energy supply in response to the downloaded set of food cooking process data. The invention also relates to an electronic library (600) having a plurality of information units, which are arranged to be downloadable from external users. According to this aspect of the invention
(Continued)

each information unit includes a set of food cooking process data. Each set includes at least two food item cooking instructions. Each food item instruction includes data defining a food item and one or more groups of operation parameters. Each group of operation parameters includes energy supply data and related time duration data for heating means in a cooking device. The invention also relates to a method for cooking food and to a method for providing food cooking support.

15 Claims, 5 Drawing Sheets

(51) Int. Cl.
   *A47J 27/00* (2006.01)
   *F24C 7/08* (2006.01)
   *G05B 15/02* (2006.01)
   *H04L 29/08* (2006.01)

(58) Field of Classification Search
   USPC ....... 219/385, 391, 422, 443.1, 448.12, 494; 434/118, 127
   See application file for complete search history.

(56) References Cited

U.S. PATENT DOCUMENTS

| | | | | |
|---|---|---|---|---|
| 2009/0249821 A1* | 10/2009 | Zentner | .................. | F24H 1/103 62/389 |
| 2009/0258331 A1* | 10/2009 | Do | ....................... | G09B 21/003 434/127 |
| 2010/0000980 A1* | 1/2010 | Popescu | .................. | A47J 36/20 219/201 |
| 2010/0116819 A1* | 5/2010 | Pan | .......................... | H05B 6/12 219/621 |
| 2010/0206869 A1* | 8/2010 | Nelson | .................... | F24D 11/02 219/494 |
| 2015/0114236 A1* | 4/2015 | Roy | ......................... | A47J 44/00 426/231 |

FOREIGN PATENT DOCUMENTS

| | | |
|---|---|---|
| EP | 1117275 A2 | 7/2001 |
| JP | 09-060886 | 3/1997 |
| JP | 09-303791 | 11/1997 |
| JP | 2000310424 A | 11/2000 |
| JP | 2002039536 A | 2/2002 |
| JP | 2002349865 A | 12/2002 |
| JP | 2007-278638 | 10/2007 |
| JP | 2012-085694 | 5/2012 |
| WO | WO 2012/139392 | 10/2012 |

OTHER PUBLICATIONS

English translation of second office action received in corresponding Chinese application No. 201380029645.1, received from foreign associate on Dec. 2, 2016, 4 pps.
English translation of third office action received in corresponding Chinese application No. 201380029645.1, received from foreign associate on Dec. 2, 2016, 5 pps.

* cited by examiner

FOOD COOKING DEVICE, AN ELECTRONIC LIBRARY AND METHODS RELATED THERETO

CROSS-REFERENCE TO RELATED APPLICATIONS

The present Application is a U.S. national stage of and claims priority to and the benefit of International Application No. PCT/SE2013/050435, filed on Apr. 23, 2013, which claims priority to Swedish Application No. 1250577-2, filed on Jun. 4, 2012. Both applications are incorporated herein by reference in their entireties.

FIELD OF INVENTION

The present invention in a first aspect relates to a food cooking device having a plurality of heat sources for heating a respective food item and control means arranged to individually control energy supply to each of the heating means.

In a second aspect the invention relates to an electronic library with a plurality of information units which are arranged to be downloadable by an external user.

The invention also relates to a food cooking system.

In a third aspect the invention relates to a method for cooking food on a cooking device having a plurality of heating means for heating a respective food item and control means arranged to control the energy supply to each of the heating means.

In a fourth aspect, the invention relates to methods for providing food cooking support.

BACKGROUND OF INVENTION

When preparing a meal it is usual that the meal consists of a plurality of food items that are to be cooked simultaneously or partly simultaneously on different heat sources on a cooking device such as stove having a plurality of stove plates, gas burners, micro wave heaters etc. The heat sources might also be of the kind having an electric heating element in direct contact with a food item in a cooking pot.

Preparing a meal in this way traditionally requires a lot of manual work. For each food item cooked on a respective one of the heating sources, the heat supply has to be regulated which might include various periods of different heat supply rates at various time durations, and which are related to the amount of the food item. Often it is necessary to synchronize the cooking on each heating source to each other either in parallel to each other or sequentially, but in many cases both. The person cooking the meal thereby uses recipes having instructions for the cooking parameters or uses own knowledge or a combination of these. The recipes might be taken from books, magazines, electronic media or downloaded to a computer.

A traditional preparing of a meal therefore is very circumstantial, time consuming and to a large extent relies on the skill and experience of the person in question.

SUMMARY OF THE INVENTION

The object of the present invention is to rationalize the work involved with preparing a meal such that the engagement time for the cooking person and/or the requirement for the skill and experience of him/her are reduced.

This object in the first aspect of the invention is achieved in that a food cooking device of the kind specified in the introduction of the description includes the specific features specified in the characterizing portion of claim 1. The food cooking device thus includes a microprocessor with downloading means arranged to download a set of food cooking process data, and the control means is arranged to control the energy supply in response to the downloaded set of food cooking process data.

Thereby the cooking of a meal is radically simplified and less dependent on the skill and experience of the person preparing the meal. The cooking person only have to download the data, arrange a cooking pot with a food item therein connected to some of the heat sources and give a start command. The meal may then in principle be automatically prepared and ready for serving at the end of the process without any manual interference.

The food cooking device includes a microprocessor in the sense that the microprocessor either may form a part of the physical entity constituting the cooking device or it may be a separate unit that is connected to the cooking device. Thus in the present application it is to be understood that a stove connectable to a microprocessor with the claimed functionality may form a cooking device as claimed.

One of the heat sources of the food cooking device may be an oven.

According to a preferred embodiment of the invented food cooking device, the microprocessor includes searching means for searching among a plurality of sets of food cooking process data and selecting means for selecting one of the sets.

By integrating these functions into the microprocessor of the cooking device it will be easy to obtain a certain set to be downloaded.

According to a further preferred embodiment, a set of food cooking process data includes one or more food item cooking instructions, each food item cooking instruction including data defining a food item and at least one group of operation parameters, which group includes power supply data and time duration data for one of the heating means.

This content of a set of food cooking process data provides an optimal set with respect to achieve the automatization of the cooking process. Although the invention may be applied for only one food item cooking instruction, the benefits of the invention is mainly gained from when there are a plurality of food items involved and which requires a plurality of such food item cooking instructions.

The downloaded set of cooking process data may also include various additional information, such as manually readable text and/or figures that can be shown on the display. The downloaded set may also include the selection of a certain heating means for a certain food item and instructions regarding what kind of food and how much that is to be used at each heating source.

According to a further preferred embodiment, the microprocessor includes processing means arranged to process the operation parameters to be adapted to the particular type of cooking means.

The energy supply data such as power supply and duration time in the downloaded set of food cooking process data might be valid for a certain kind of cooking device according to a certain standard. However, the actual data for the cooking parameters may be different for different kinds of cooking apparatuses depending i.a. on the type of heating means; stove plates, gas burners, direct electrical heating etc. The processing means has information about the certain standard on which the downloaded data is based and concordance information about what these standardized data corresponds to for the cooking device to which it is related.

Thereby the source from where the information is downloaded does not necessarily have to have a different set of food cooking data for different types of cooking devices. The cooking device thereby becomes more flexible with regards to requirements on the information source.

According to a further preferred embodiment, the microprocessor includes processing means arranged to process the operation parameters to be adapted to the size of the respective food item.

This also provides flexibility similar to that next above. If the downloaded set of cooking process data is based on a certain standard size of the meal, and the actual need deviates therefrom, this function provides an adaption.

According to a further preferred embodiment, the food cooking device includes a manual interface means related to the microprocessor which interface means includes an information presentation device and/or a setting device.

This in a simple way provides the person preparing a meal with facilities to be informed about all data related to the cooking process and also to interfere in the process in order to affect it. The information presentation device may be visual, e.g. a display and/or acoustic. The setting device may be touch buttons on the display or a keyboard.

According to a further preferred embodiment, the setting device is arranged such that the downloaded set of cooking process data can be modified, and in that the control means is arranged to operate in response to the modified set of cooking process data.

This provides an alternative to the automatic adaption that can be obtained with the processing means described above. It is a more simple alternative regarding the device as such but requires more engagement by the person preparing the meal. The manual setting for modifying the data also has the advantage that it allows the person a freedom to deviate from the prescribed cooking instruction if desired. The manual setting may include the setting of a certain size of the meal, whereby size might be number of persons, weight, volume or number of pieces of the food item in question. Setting of the size thereby is compared in the microprocessor with a standard size on which the downloaded data is based and the comparison is processed in order to convert the data into data relevant for the size in question, a conversion that not necessarily is linear. This function reduces the need that the source of the downloaded data has to have a corresponding conversion function. Generally this embodiment thus offers a flexibility to tailor the cooking instruction in consideration of various influencing conditions that are not foreseen in the downloaded instruction.

According to a further preferred embodiment, the microprocessor includes timer means and the setting device is arranged to set the timer means.

Thereby is provided a possibility to set a starting time or an end time for the complete cooking process. This allows the person preparing the meal to make all preparations in advance, and he/she does not need to be present when the actual cooking process starts. The starting or end time can for example be set such that all components of the meal is ready for serving at the time the person comes home from work. The downloaded set of cooking process data may advantageously include a relative timing for the different heat sources. However, if that is not the case, also the relative timing can be set by the setting device. In case there is a relative timing inherent in the downloaded set of cooking process data, this can be changed if desired for some reason.

According to a further preferred embodiment, the food cooking device is of a kind in which the control means includes a control unit with a conductor arranged to be connected to an energy supply, which control unit is provided with a plurality of electrical connection means, each connection means being arranged to be connectable to a cooking pot for supply of electric energy to a respective cooking pot and in that the control unit is arranged to allow simultaneous supply of electric energy through said plurality of connection means, and whereby the control unit is arranged to govern switching means related to each connection means.

A cooking device of this kind has many advantages over traditional cooking devices. Such a cooking device is particularly well adapted for an automatization of the cooking process with a minimum of manual interference. The direct heating of the food items and the direct control of the energy supply makes it very suitable for being governed by a downloaded set of cooking process data. Further advantages of such a cooking device are described further below, and various preferable embodiments of this cooking device are described.

The switching means may advantageously be provided in the control unit and form a component thereof. Alternatively switching means may be provided in each electrical connection means or be related to each cooking pot.

According to a further preferred embodiment of the invention, the microprocessor is provided with uploading means for uploading food cooking information to a receiver.

This two-way communication creates further advantages. The food cooking information may be a set of food cooking process data of the same format as specified for the downloading. Thereby the cooking device can add information units to an external electronic library such that it is downloadable therefrom. The uploaded food cooking information may also be as a feedback on a downloaded set of food cooking process data such that the set can be modified if desirable, either generally modified or only for the cooking device from where the feedback is delivered.

According to the second aspect of the invention, the object is achieved in that an electronic library of the kind specified in the introduction of the description includes the specific features specified in the characterizing portion of claim 11. The electronic library thus is such that each information unit includes a set of food cooking process data including at least two food item cooking instructions, each food item cooking instruction including data defining a food item and at least one group of operation parameters, said group of operation parameters including power supply data and related time duration data for a heating means in a cooking device.

With the invented electronic library, cooking devices with downloading functions according to the present invention can be provided with the necessary input for preparing a meal in an efficient way. The electronic library therefore contributes to attain the advantages related to such cooking devices as described above.

An information unit may of course include various further kinds of information. It may for example include information prescribing on which one of the heating means a particular food item is to be cooked. The information unit may also include manually readable text and/or pictures that can be shown on a display on the cooking device downloading the information unit.

According to a preferred embodiment of the electronic library, each information unit includes a plurality of alternative variants of the set of cooking process data, each variant being related to a certain kind of cooking device in respect of the kind of heating means.

This embodiment makes the electronic library generally usable for downloading to various kinds of cooking devices independent if they have stove plates, gas burners or direct electrical heating elements. It eliminates the need to have conversion processing means in the cooking apparatuses in question for the corresponding purpose. The variants may of course include a lot of sub-variants related to various characteristics of the cooking device in question. The set of cooking process data may advantageously have variants in dependence of the size of the meal. Also this eliminates the need to for size-related conversion processing means in the cooking devices.

According to a further preferred embodiment, the electronic library is provided with identification means arranged to identify an external user that has downloaded an information unit.

Such identification is valuable for billing purposes, in case the economy of the electronic library is partly or completely based on fees for using it. Billing might be based on subscription, by including this service when a cooking device with download function according to the present invention is purchased, or by having a fee for each download or be a combination of these. Even in a case where the service is provided for free it is advantageous to keep record on by whom information units are downloaded, for example when acquiring advertisers to the electronic library if that is of interest.

According to a further preferred embodiment, the electronic library includes downloading means for downloading food cooking information.

The library thereby can be loaded with further information units supplied from external sources e.g. cooking devices having uploading means. The library also may receive feedback information from cooking devices that has downloaded food cooking process data from the library. Based on such feedback, the library may use the feedback information for modifying a certain information unit, either generally or selectively.

According to further preferred embodiments, the electronic library includes a computer readable medium storing the information units, preferably the computer readable medium is a non-volatile storage device.

A food cooking system according to the invention includes a plurality of food cooking devices according to the present invention, in particular to any of the preferred embodiments thereof and an electronic library according to the present invention, in particular to any of the preferred embodiments thereof, whereby each cooking device is arranged to be able to download a set of food cooking process data from the electronic library.

According to the third aspect of the invention the object is achieved in that a method for cooking of the kind specified in the introduction of the description includes the specific measures specified in the characterizing portion of claim 18. The method thus includes the steps of using a cooking device having a microprocessor with downloading means, downloading a set of food cooking process data and control the energy supply in response to the downloaded set of food cooking process data.

According to preferred embodiments of the invented method for cooking, it is performed with a cooking device according to the present invention, in particular according to any of the preferred embodiments thereof, or with a food cooking system according to the present invention.

According to the fourth aspect of the invention the object is achieved in that methods for providing food cooking support includes the specific measures specified in the characterizing portion of claim 21 and/or includes the specific measures specified in the characterizing portion of claim 22. The method thus includes the steps of electronically storing a plurality of sets of food cooking process data, arranging the sets of food cooking process data to be downloaded from external users and/or delivering a downloaded set of food cooking process data in a format including at least two food item instructions, each food item cooking instruction including data defining a food item and at least one group of operation parameters, said group of operation parameters including power supply data and time duration data for a heating means in a cooking device.

According to preferred embodiments of the method for providing food cooking support it is performed with an electronic library according to the present invention, in particular to any of the preferred embodiments thereof, or with a food cooking system according to the present invention.

The invented food cooking system, the invented method for cooking food and the invented method for providing food cooking support and the preferred embodiments thereof have advantages similar to those of the invented food cooking device and the invented electronic library, which advantages have been described above.

The above described preferred embodiments of the invention are specified in the dependent claims. It is to be understood that further preferred embodiments of course can be constituted by any possible combination of the preferred embodiments above and by any possible combination of these and features mentioned in the description of examples below.

The particular embodiment with a control unit controlling direct heating of cooking pots allows a very energy-efficient cooking since the electric energy is delivered directly to the cooking pots to which the control unit is connectable. The plurality of connection means further allows that cooking in the different cooking pots can be made simultaneously which results in a short cooking time for providing a meal with various ingredients. Since the cooking takes place in cooking pots separated from the cooking apparatus, the use of the cooking apparatus is very flexible. The cooking apparatus as such has no cooking chambers or the like that entails restrictions regarding the number, sizes and character of the spaces in which the different food items are prepared. The number of cooking pots that is connected to the cooking apparatus thus can be selected in dependence of what actually is required for a certain cooking. Each cooking pot that is to be connected to the cooling apparatus can be selected according to the needs of the food item that is to be prepared therein with respect to volume, proportions and design and with respect to kind of cooking, e.g. boiling or frying. This flexibility also contributes further to the energy-efficient operation since over-dimensioned or in other respects non-optimal pots for the various food items can be avoided.

Such a cooking thereby has many advantages over a conventional stove for cooking. The energy consumption will be much lower, typically in the range of 40 to 50% lower, due to the direct heating. The cooking time will be reduced with up to 75% in comparison with conventional cooking. A much lower amount of fat when frying is required. The apparatus is also particularly children safe since there are no open exposed heat sources. Through the apparatus further a high degree of automation can be achieved and also a better control of the cooking process than through a conventional stove is achieved.

Besides being very suitable to be operated by using a downloaded set of food cooking process data, this type of cooking apparatus may advantageously be provided with various further functions and various further input sources for governing the cooking process as set out next below.

The term switching means in the present invention includes ON/OFF-switching as well as regulation switching, i.e. switching the power level continuously or discontinuously.

Preferably, the switching means includes an ON/OFF-switch for at least one of the connection means. Thereby the supply of energy to the cooking pot in question can be controlled in a very simple way. It eliminates the need to connect/disconnect the cooking pot for that purpose or to provide the cooking pot with a corresponding switch. Preferably the switching means in the cooking apparatus includes an individual ON/OFF-switch for each of the connection means.

Preferably, the switching means includes regulating means for regulating the power level of the energy supplied through at least one of the connection means. Thereby a specific cooking program can be applied to the cooking pot in question, e.g. reducing the power level when a certain temperature has been reached or after a certain time. To provide this functionality present in the cooking apparatus further has similar advantages as those described above for the ON/OFF-switch. Also here it is preferred that the power level regulating means of the cooking apparatus is arranged for regulation of the energy supplied through each connection means.

Preferably the switching means includes individual switching means for each connection means. Thereby the cooking process in the respective cooking pot can be regulated separately regarding ON/OFF regulation and/or power regulation. Since the cooking process required in the respective pot normally will be different from each other this regulation possibility meets this need. The cooking processes thus can be individually optimized and a suitable timing can be attained. The individual switching means may operate completely independently of each other. Alternatively a dependency functionality can be present. For example one of the individual switching means can be arranged to operate in response to another of the individual switching means with respect to timing or some other parameter.

Preferably the control unit includes information receiving means, and at least one of the connection means includes information transmission means arranged to transmit information to the information receiving means. Thereby the control unit can receive feedback from the cooking pot connected to that connection means. Such feedback information might be useful for updating the operation of the switching means. The information may be the temperature of the food item. The information can for example be presented on a display on the control unit and/or trigger a sound or light signal in the control unit. Adjusting the operation may be done manually or automatically. Preferably all the connection means include such information transmission means.

Preferably the switching means is arranged to operate in response to information received by the information receiving means through the information transmission means. Thereby an automatic operation of the cooking process can be achieved, in particular when all connection means have an information transmission means and an individual switching means. This reduces the need for manual interference during the cooking.

Preferably each connection means includes a flexible cord. Thereby the flexibility of the operation of the cooking apparatus is further increased in that the location of the cooking pots can be freely chosen within the lengths of the cords and thus facilitate the handling of the cooking process. It will also eliminate the need to provide the cooking pots with cords, which would be less convenient.

Preferably the control unit includes a program control means allowing the pre-setting of a certain program for the energy supply to at least one of the connection means, which program defines a power level and a time duration of a cooking period.

This programming of the control unit further reduces the need for manual supervision of the cooking process. The program may be processed by a microprocessor arranged in the control unit or docked thereto for providing commands to the switching means according to the program that is pre-set. The input for setting the preset may be of various kinds, e.g. a manually operated control panel or a reader reading e.g. an EAN-code or a chip of a smart card. The control unit thus may be provided with such a control panel or a reader, respectively. The microprocessor may be provided with storing means for storing a library of programs, whereby the input merely needs to be a certain number, identifying a certain program in the library. The input in that case may also include a code representing the size of the cooking pot connected to the connection means and/or the amount of the food item therein such that a stored program can be adapted thereto. Of course the input may include time-related information, stipulating the starting time, the end time or similar. The control unit may have an interactive display that can display set orders, feedback information from the cooking pots, etc and through which the stored programs can be searchable. Preferably the program control means is such that it allows the described control of each connection means.

Preferably the certain program includes a sequence of a plurality of such periods, each period being individually pre-set with regards to power level and time duration. Thereby a complete cooking process can be tailored for the cooking of the food item in the pot concerned in a simple and flexible way.

Preferably the control means is arranged to allow an individual pre-setting for each connection means independently of each other. This represents an ultimate possibility to adapt the cooking process in the respective pot to what is individually required and to synchronize these processes to each other such that the starting moments and end moments are selected to have the complete meal ready at a certain time.

Preferably the certain switching program for the connection means to a cooking pot is adjustable in response to information received to the information receiving means. Thereby the advantages of using the feedback information from the cooking pots and the advantages of applying a certain program for the cooking process are combined. Thereby the cooking can be optimized with respect to minimizing the need for manual operation, maximizing the precision and in a simple way have a high degree of flexibility.

The invention will be further explained through the following detailed description of examples thereof and with reference to the accompanying drawings.

DESCRIPTION OF EXAMPLES

Figure 1:
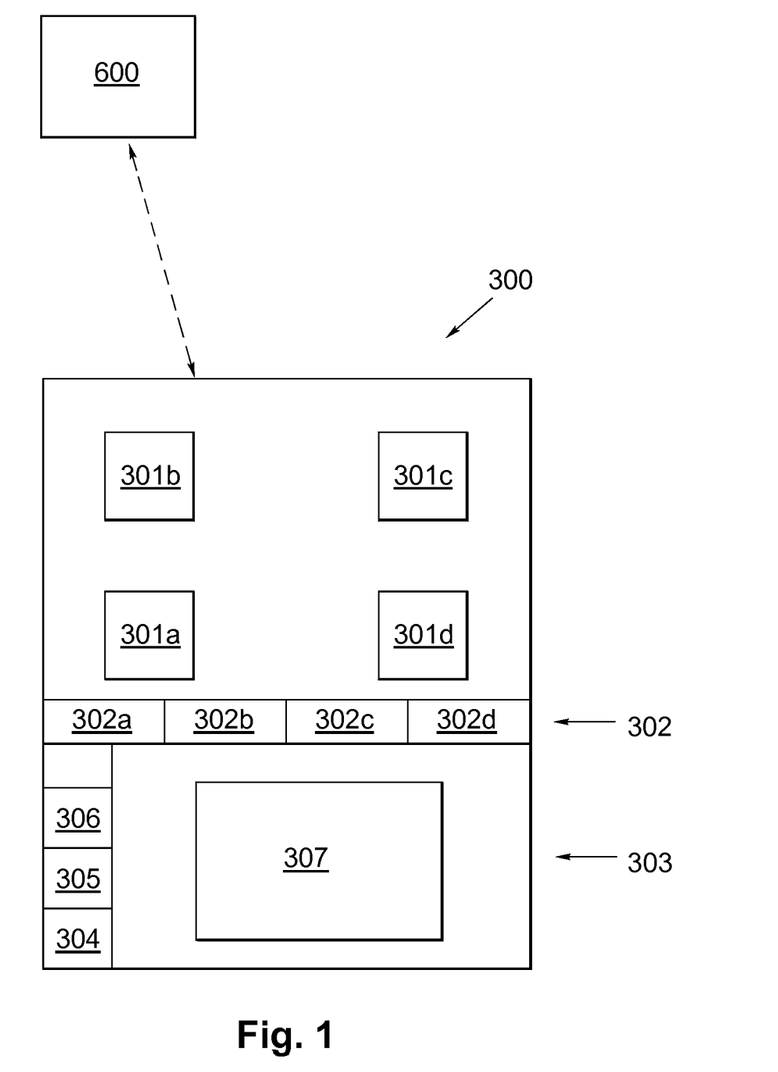
FIG. 1. Is a diagram illustrating the principle of the invention.

FIG. 1 in a diagram illustrates the basic principle of the invention. An electronic library 600 stores a plurality of sets of food cooking process data. A cooking device 300 has facilities to select and download a certain of the food cooking process data stored in the electronic library 600. The downloaded set of cooking process data is used to perform the cooking process on the cooking device 300.

The cooking device has four heat sources 301a-301d. Each heat source 301a-301d is arranged to heat a certain food item in a cooking pot. The heat sources may be of any kind, and in relation to FIGS. 3-8 cooking devices having different kinds of heating means are exemplified.

The cooking device 300 is provided with control means 402a-402d controlling the energy supply to the heating means 301a-301d, whereby each control means 302a-302d individually controls a respective heating means 301a-301d.

Each downloaded set of food cooking process data is in a certain format to which the cooking device is adapted. A set of food cooking process data has one to four food item cooking instructions, one for each heating source 301a-301d that is required to cook a complete meal, where one food item is cooked by a related heating means. Each food item instruction defines the food item and contains one or more groups of operation parameters. Each group of operation parameters includes power supply data and time duration data for the heating means 301a-301d in question.

The cooking device has a microprocessor 303 governing the control means 302a-302d. The microprocessor has a display 307 with touch buttons through which the microprocessor can search information sources and communicate with a selected source, e.g. such as the electronic library 600. Alternatively a keyboard may be present. The display 307 with touch buttons (or alternatively a keyboard) thus functions as an interface means between the user and the device, and includes the functions of being search means, selecting means, information presentation means and setting device.

In addition to the cooking parameters the downloaded set of food cooking process data may also contain manually readable text and/or pictures that can be presented on the display 307.

The downloaded set of cooking process data may also include information about on which of the heating means a respective food item is to be cooked, and the food cooking process thereby is governed accordingly.

The microprocessor may have a continuous stand-by connection to the electronic library such that merely pressing an ON-command establishes communication therewith. Alternatively the connection to the electronic library 600 may be established through a web-address. Communication may be performed via internet, intranet, SMS or anything similar. A further requirement of providing an access code or a user's identification may also be present in order to allow the connection to the electronic library 600.

The cooking device may of course be connectable to various information sources providing similar information to that of the electronic library 600. It may also search for similar downloadable information on the internet or the like as long as the information has a set of food cooking process data in a format that is compatible with the cooking device. This can be done even among sources that are not a library but just contains one single set of food cooking process data.

When being connected, the user can search within the electronic library 600 for a set of food cooking process data by using the touch buttons. The microprocessor has downloading means 304 through which a selected set of food cooking process data can be downloaded. The microprocessor 303 also has processing means 305 and timer means 306.

Through the processing means 305 the downloaded set of food cooking process data can be modified if required for some reason. One reason might be that the set of food cooking process data is based on a generally standardized cooking device. The processing means 305 can compare this standardized cooking device with the cooking device to which it is related and by adequate algorithms adapt the food cooking process data accordingly. The processing means 305 may also include an event history log including records of how well an earlier downloaded set functioned with respect to the cooking result. When a set of food process data is downloaded, the processing means may then search if this set has been downloaded before. If that is the case, the downloaded set might need to be modified due to unsatisfied earlier result.

The timer means 306 governs the time duration for the cooking process at a certain power level at each heating source 301a-301d via the respective control means 302a-302d. The timer means 306 also governs the timing relation between the different heat means for example with the aim that the different food items will be ready for serving simultaneously or in a certain sequence.

In many cases the food item that is to be cooked by one of the heating means 301a-301d just requires one group of operation data, for example a power level of 800 W for 15 minutes. In other cases, however, there may be required a plurality of such groups of operation data. A cooking instruction for a certain food item might for example have a sequence of such groups prescribing a) 1000 W for 5 minutes, b) zero power for 2 minutes and then c) 500 W for 20 minutes.

After downloading the set of cooking process data, the cooking may be immediately initiated by an ON-command or alternatively be delayed by the timer means 306.

The touch buttons are not only used for searching and selecting, but may also be a tool for manually affecting the cooking process. The starting time for the food cooking process or the end time thereof can be set by the touch buttons. Through these also a size, i.e. number of persons, weight, volume etc of the meal can be set and forwarded to the processing means 305 in order to adjust downloaded operation parameters to the actual size. If the format of the downloaded food cooking instruction data is standardized for four persons and the meal is prepared for ten persons, the processing means 305 thereby provides an output to the control means 302a-302d with operation parameters adapted to ten persons.

Figure 2:
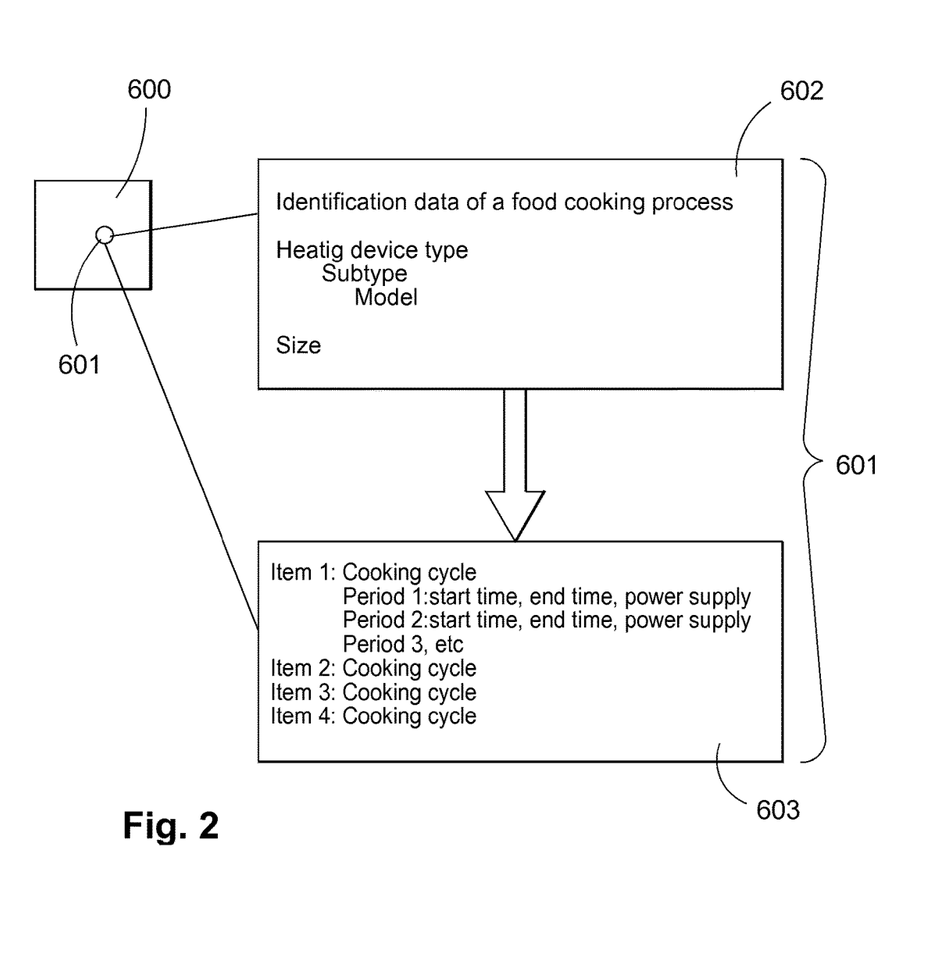
FIG. 2 is a diagram illustrating an electronic library according to the invention.

The principle of the electronic library may be as illustrated in FIG. 2. The electronic library contains a plurality if information units 601. An example of the content of an information unit 601 is shown on the right side of the figure. The information unit may have an addressing part 602 and an instruction part 603. When an external user is connected to the electronic library, a certain food cooking process can be selected by identification data. The user may also enter information regarding the type of heating device, subtype thereof and a specific model in order to access a variant of the food cooking process that is adapt to his own facilities. Also the size of the meal may be entered, e.g. in the form of number of persons for which the cooking is intended. The electronic library then provides the user with a set of food cooking instructions as shown in the instruction part.

The information unit 601 of course may include further information than exemplified in FIG. 2. For example information in manually readable text and/or pictures may be included. Another example is information regarding on which of the heating means in a food cooking device the respective food items are to be cooked.

The library may be constructed such that each information unit 601 exists in a large plurality of sub-units covering all kinds of heating device types and models and also different sizes. Alternatively the information unit 601 may exist only in a base version. The electronic library in that case may include algorithms for processing and converting the base version to be adapted to the input of the addressing part 602.

In a less sophisticated version of the electronic library 600, the addressing part may only contain the identification data of the food cooking process or identification data and size. This presumes that a user's food cooking device is of a certain predetermined type for which the information units 601 in the library 600 are tailored or that corresponding modifying functionality is present in the food cooking device of the user as described above in relation to FIG. 1.

Irrespective of how the addressing process is arranged, a certain instruction part 603 will be transmitted from the library 600 to the food cooking device of the user. The instruction part 603 contains a set of food cooking instructions; one instruction for each item to be cooked on a respective heating source. Each instruction includes one or more cooking cycles and each cycle consists of one or more periods. Each period contains order for a start time, an end time and a power supply level.

It is to be understood that the addressing part 602 as well as the instruction part may include more pieces of information or be more sophisticated than exemplified in FIG. 2. The instruction part may include instructions based on feedback from the user's device, such as parameters relating to the cooking process of one of the food items. For example the start time and/or the end time may be governed by the reaching of a predetermined temperature threshold of the food item in question or even by a corresponding threshold of another food item that is included in the same food cooking process. Such feedback based instruction of course requires that the user's device is equipped with sensing facilities, e.g. temperature sensors for providing the feedback.

The addressing part 602 of the information unit may include a possibility to inform the library whether the user's device has this feedback possibility or not, and provide different versions of the instruction part 603 in dependence of if that is the case or not. This information may be provided to the library as a certain addressing information unit or be a consequence of the selected subtype and model.

FIGS. 3 to 6 illustrate a food cooking device of a type that is very different from traditional cooking on stoves, but is particularly suitable for use in connection with the present invention.

Figure 3:
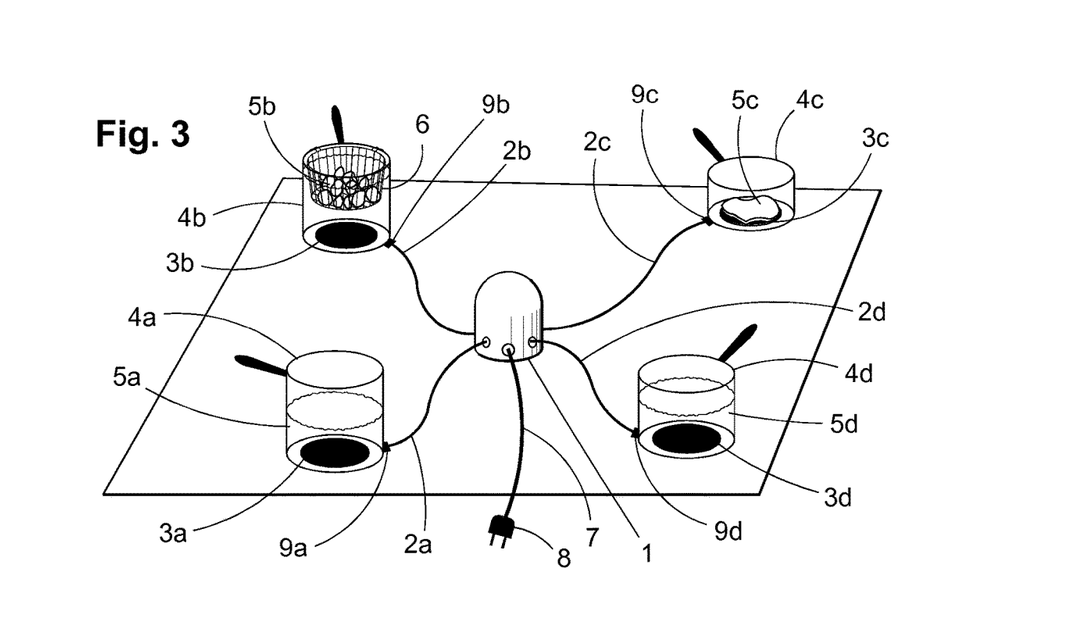
FIG. 3 is a schematic representation in a perspective view of a cooking device according to a first example of the invention.

The cooking device illustrated in FIG. 3 is shown on a table. It might be any table, plate or board in a kitchen or somewhere else. In order to harmonize with conventional cooking and kitchen design the plate may be located on top of a stove-like unit, having an oven but no other cooking facilities on the top.

Four cooking pots 4a, 4b, 4c, 4d are placed on the cooking device. The cooking device has a control unit 1, a cord 7 with a plug 8 for connection to a wall socket. It further has a connection means 2a, 2b, 2c, 2d connecting the control unit 1 to each of the cooking pots 4a, 4b, 4c, 4d, where each connection means in this example is a cord 2a, 2b, 2c, 2d.

Each cooking pot 4a, 4b, 4c, 4d has a respective heating means 3a, 3b, 3c, 3d for heating a respective food item 5a, 5b, 5c. Each heating means 3a, 3b, 3c, 3d has a plug 9a, 9b, 9c, 9d establishing a connection unit 9a, 9b, 9c, 9d that is connectable to a respective socket at the ends of the cords 2a, 2b, 2c, 2d.

Alternatively, the connection unit of each cooking pot may include a cord. In that case each connection means of the cooking apparatus may merely consist of a socket attached to the control unit.

All the cooking pots may be similar to each other. However, for illustrative purposes the figure depicts different kinds of cooking pots. The cooking pots 5a and 5d are merely pots containing a liquid food stuff, e.g. soup or sauce and the respective heating means 3a, 3d is in direct contact therewith.

The cooking pot 4b contains water and a food stuff 5b such as potatoes located in a metal basket 6 inside the pot and immersed in the water. The heating element 3b heats the water by direct contact therewith and thereby cooks the food stuff.

The food item 5c in the cooking pot 4c is a piece of meat resting on the heating means 3c to be fried thereon.

It is to be understood that other types of cooking pots may be used in the cooking device. The cooking pots may be made of transparent material such as glass or by non-transparent material such as steel. They may be open or have a cover, may be rectangular or circular, etc.

The cooking processes in the different pots 4a, 4b, 4c, 4d are individually governed by the control unit 1 and may occur simultaneously, partly simultaneously or in sequence in dependence of the need. The control unit 1 and thereby the supply of electric heating to the cooking pots 4a, 4b, 4c, 4d can be manually, semi-manually or automatically operated.

Figure 4:
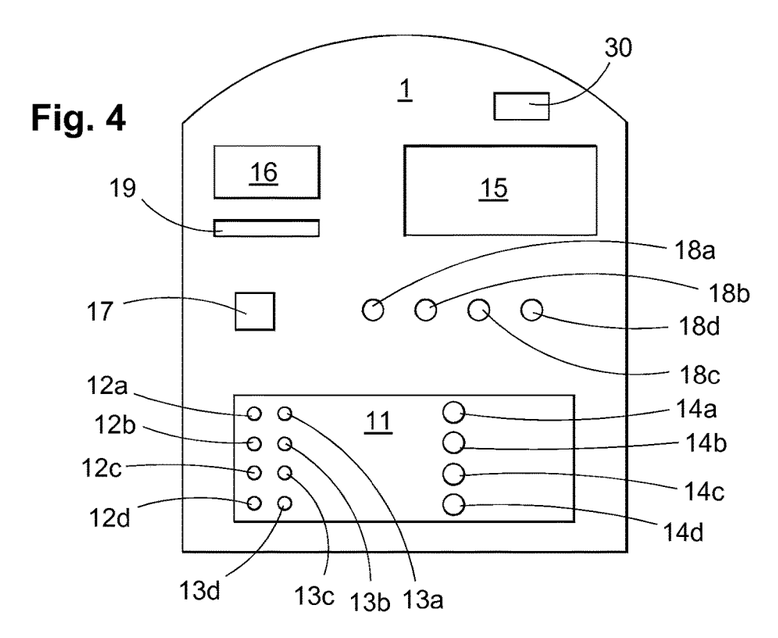
FIG. 4 is a simplified side view of a control unit in a cooking device according to the first example.
Figure 5:
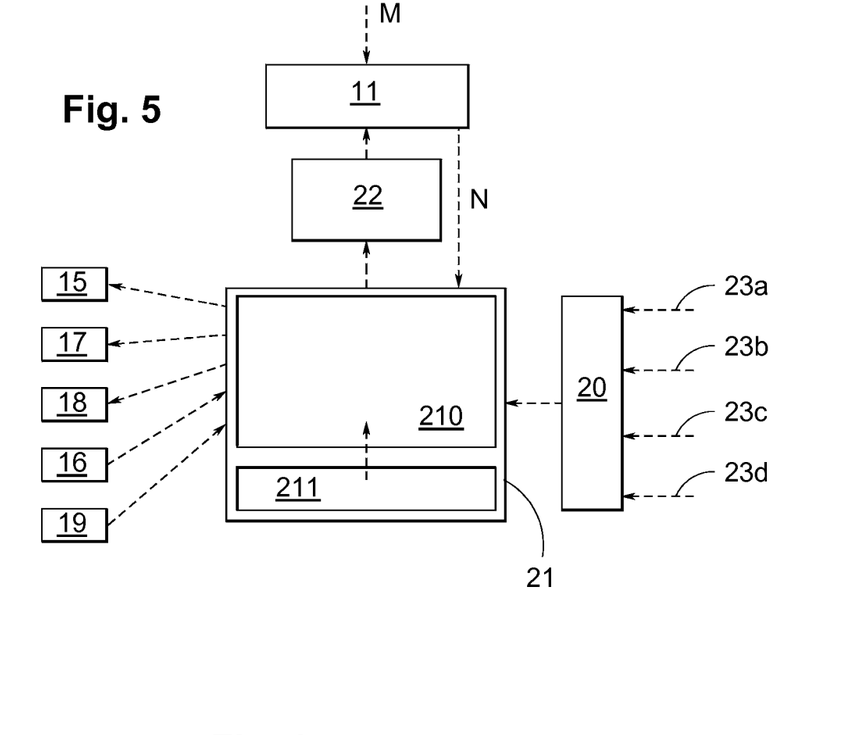
FIG. 5 is a diagram illustrating the cooperation of the components of the control unit in FIG. 4.

FIGS. 4 and 5 more in detail describes the operation of the control unit 1. The control unit has switching means 11 with individual switches for each connection means. Thus there are four pairs of ON/OFF switches 12a, 13a, 12b, 13b, 12c, 13c, 12d, 13d, each pair related to a respective connection means 2a, 2b, 2c, 2d. There are also four regulating means 14a, 14b, 14c, 14d through which the power level of energy supply to the respective connection means 2a, 2b, 2c, 2d can be regulated. The figure is intended to describe the functionality of the control unit rather than illustrating how the switches are arranged. It is thus to be understood that in practice the ON/OFF switches may be one single button or be an integral part of the regulating means 14a, 14b, 14c, 14d such that OFF-function is achieved by turning the regulating means to zero level. The switching means is illustrated as having manually operated switches. This can be the case in simple realisations of the invention. As will be understood further on, the operation of the switches may be fully automatic making manually operated switches redundant. Alternatively the switching functions can be performed by a combination of manual and automatic commands or by selecting either of these modes. The presence of manually operated switches as illustrated in the figure thus is optional in dependence of the sophistication degree of the cooking apparatus.

The illustrated control unit 1 also has a display 15 on which various information relating to the individual cooking processes can be shown, such as actual temperature, desired end temperature, starting time, finishing time, power level etc can be shown. Further there is a keyboard 16 on which manual commands can be made, e.g. changing the cooking program for a certain cooking pot in response to information on the display or due to other reasons. Of course the display may be a touch screen such that a separate keyboard is superfluous.

A speaker 17 is arranged to provide sound signals from the cooking pots according to certain criteria such as time or temperature related. Signal lamps 18a, 18b, 18c, 18d are arranged to provide corresponding visual information.

The control unit 1 also has a slot 19 for receiving and reading a smart card for providing input to the cooking process. Such a smart card may have control orders for a certain complete meal and thus govern the switching and power supply to the different cooking pots. The smart card thus functions as a "recipe" that may be chosen from a collection of such cards.

The control device 1 is also provided with a receiver 30 for wireless receiving food cooking instructions via internet or the like from an external source as described in relation to FIG. 1.

As evident from the above the control unit of the cooking apparatus may include only a few of the inputs mentioned above and none or just one of the output indicators. On the other hand it might include all of the devices described above. The control unit thus can be realized at various degrees of sophistication from a pure manual one to a complete automatic unit. For a control unit having manual as well as various automatic settings of the program the unit may have a mode selector for choosing the desired alternative. As also should be evident, a combination of automatic and manual and/or feedback-related control also can be possible allowing interference in a pre-set program manually or in response to feedback information.

FIG. 5 in a diagram represents the logics of the control unit described above. Also FIG. 5 illustrates a control unit with a high degree of functionality and it is to be understood that parts thereof may be omitted for more simple applications. The core part is the switching means 11 having ON/OFF-switches and/or power level regulators for the different cooking pots connected to the control unit. The switching means is actuated either by the program control means 22 or manually M or combined. In case the switching means is arranged to be solely operated by the program control means 22 external buttons or the like as shown in FIG. 2 may be omitted.

The program control means 22 receives signals from a microprocessor 21 for executing the switching. A processing unit 210 of the microprocessor 21 receives input information from various sources, of which some may be optional. One input source is the information receiving means 20, receiving status information e.g. temperature from each of the cooking pots 4a, 4b, 4c, 4d connected to the control unit via a respective information transmitting means 23a, 23b, 23c, 23d. Another input source may be the keyboard 16 on the control unit 1. A further one may be the reader in the smart card slot 19. The microprocessor 21 may also have a storage unit 211 for the storage of various switching programs forming a recipe library. The library may be pre-installed, and the storage unit 211 may be arranged to be up-dated by downloading further programs.

In application allowing also manual switching through buttons, the microprocessor 21 also receives information of the switching status as illustrated by the arrow N.

The information received to the microprocessor 21 is processed in its processing unit 210 to provide the required commands to the program control means 22. The microprocessor 21 also provides output information to the display 15, to the speaker 17 and to the signal lamps 18, to the extent these functions are present.

Figure 6:
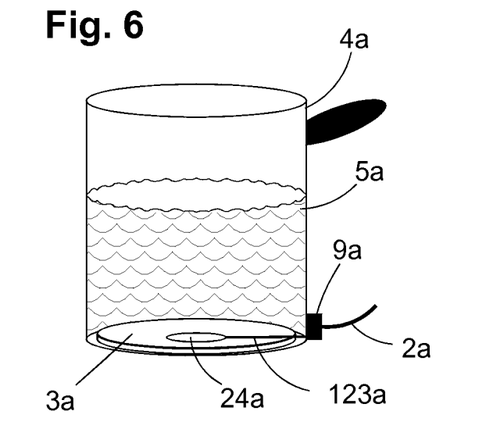
FIG. 6 is a schematic representation in a perspective of a cooking pot for a cooking device according to the first example.

FIG. 6 illustrates the cooking pot 4a in FIG. 2. The heating element 3a has a temperature sensor 24a sensing the temperature of the food item in the cooking pot. By an information delivery means 123a connected to the connection unit 9a information of the sensed temperature is transmitted to the microprocessor 21 of the control unit via the information transmission means 23a in the connection means 2a. In this example the temperature sensor is illustrated as integrated with the heating unit 3a. Alternatively the temperature sensor may be located somewhere else in the cooking pot. A plurality of temperature sensors may be provided. Other kinds of sensors might also be present such as viscosity sensor or a smoke detector.

The heating unit 3a is illustrated to be located on the bottom of the pot, but it is to be understood that it alternatively can be arranged higher up in the pot.

Figure 7:
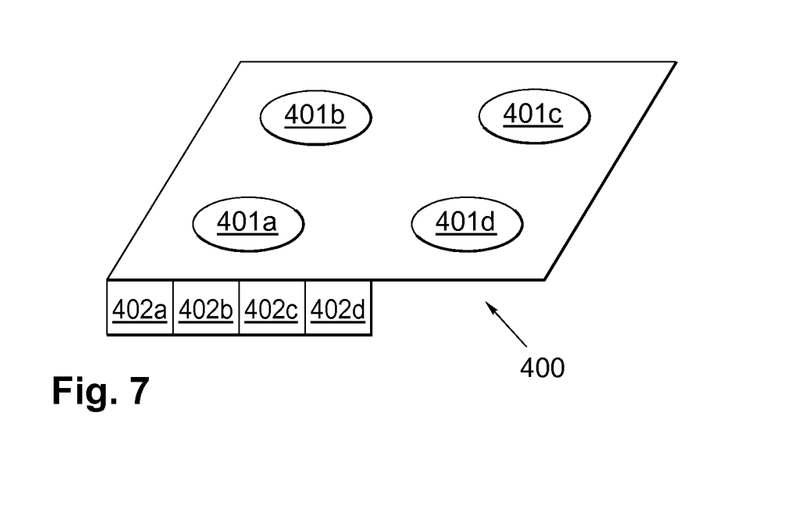
FIG. 7 is a schematic view in perspective of a cooking device according to a second example of the invention.

In FIG. 7 the cooking device is an electric stove 400 having downloading means according to the invention, but may in all other respects be of a conventional kind. The stove 400 thus has four stove plates 401a-401d or alternatively heating areas of an induction hob. Each stove plate 401a-401b is controlled by a respective control means 402a-402d. The control means 402a-402d control the time and electric power supply to the stove plates and are governed by a microprocessor with downloading means as described in relation to FIG. 1.

Figure 8:
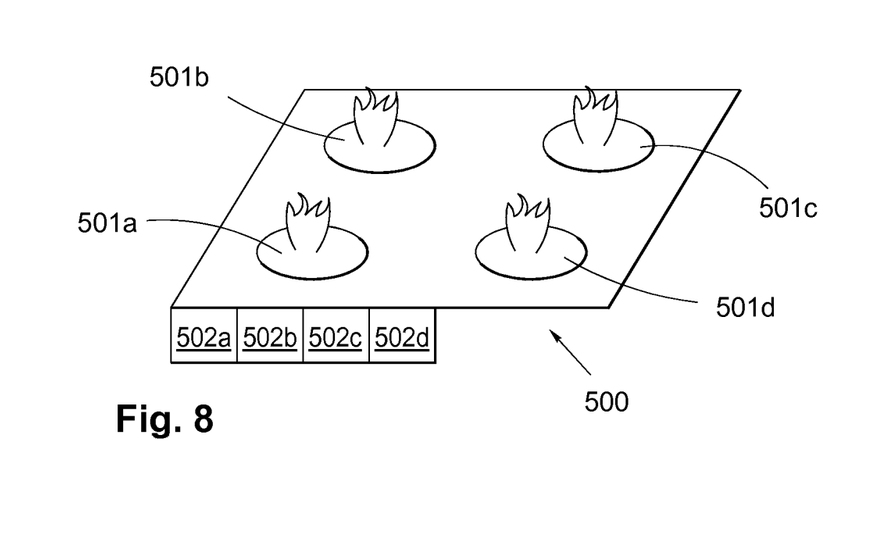
FIG. 8 is a schematic view in perspective of a cooking device according to a third example of the invention.

In FIG. 8 the cooking device is gas cooker 500 having downloading means according to the invention, but may in all other respects be of any conventional type. The gas cooker has four burners 501a-501d which are controlled by a respective control means 502a-502d. The control means 502a-502d control the time and gas supply to the burners and are governed by a microprocessor with downloading means as described in relation to FIG. 1.

It is to be understood that the invention can be applied to any other suitable kind of stove or cooking device than those exemplified above.

The invention claimed is:

1. A food cooking device including a plurality of cooking pots and a plurality of heating means for heating a respective food item, each of the heating means being arranged with a respective cooking pot, and a control means arranged to individually control energy supply to each of the heating means, wherein the food cooking device includes a microprocessor with a downloading means arranged to download a set of food cooking process data, in that the control means is arranged to control the energy supply to a plurality of the heating means in response to said downloaded set of food cooking process data in order to automatically prepare a meal for serving at the end of a process without any manual interference, wherein the heating means are configured to be in direct contact with the respective food item in the respective cooking pot, and wherein the control means includes a control unit with a conductor arranged to be connected to an energy supply, which control unit is provided with a plurality of electrical connection means, each connection means being arranged to be connectable to a cooking pot for supply of electric energy to a respective cooking pot and in that the control unit is arranged to allow simultaneous supply of electric energy through said plurality of connection means, and in that the control unit is arranged to govern switching means related to each connection means.

2. The food cooking device according to claim 1, wherein the microprocessor includes a searching means for searching among a plurality of sets of cooking process data and a selecting means for selecting one of said plurality of sets of food cooking process data for downloading.

3. The food cooking device according to claim 1, wherein said set of food cooking process data includes one or more food item cooking instructions, each food item cooking instruction including data defining a food item and at least one group of operation parameters, said group of operation parameters including power supply data and time duration data for one of said heating.

4. The food cooking device according to claim 3, wherein said microprocessor includes a processing means arranged to process the operation parameters to be adapted to the particular type of the cooking means.

5. The food cooking device according to claim 4, wherein said microprocessor includes processing means arranged to process the operation parameters to be adapted to the size of the respective food item.

6. The food cooking device according to claim 1, wherein the food cooking device includes a manual interface means related to the microprocessor which interface means includes at least one of an information presentation device and a setting device.

7. The food cooking device according to claim 6, wherein the setting device is arranged such that the downloaded set of cooking process data can be modified, and in that the control means is arranged to operate in response to the modified set of cooking process data.

8. The food cooking device according to claim 6, wherein the microprocessor includes a timer means, and in that the setting device is arranged to set the timer means.

9. The food cooking device according to claim 1, wherein the microprocessor includes an uploading means arranged for uploading food cooking information to an external receiver.

10. A food cooking system, comprising:
  a plurality of food cooking devices and at least one electronic library including a plurality of information units, which are arranged to be downloadable from external users, wherein each information unit includes a set of food cooking process data including at least two food item cooking instructions, each food item cooking instruction including data defining a food item and at least one group of operation parameters, said group of operation parameters including energy supply data and related time duration data for a heating means in a cooking device, and in that each food cooking device includes a microprocessor with a downloading means that is arranged to be able to download a set of food cooking process data from said at least one electronic library, wherein each food cooking device also includes a plurality of cooking pots and a plurality of heating means for heating a respective food item, each of the heating means being arranged with a respective cooking pot, the heating means configured to be in direct contact with the respective food item in the respective cooking pot, and a control means arranged to individually control an energy supply to each of the heating means, wherein the control means is arranged to control the energy supply in response to said downloaded set of food cooking process data in order to automatically prepare a meal for serving at the end of a process without any manual interference, and wherein the control means includes a control unit with a conductor arranged to be connected to the energy supply, which control unit is provided with a plurality of electrical connection means, each connection means being arranged to be connectable to a cooking pot for supply of electric energy to a respective cooking pot and in that the control unit is arranged to allow simultaneous supply of electric energy through said plurality of connection means, and in that the control unit is arranged to govern switching means related to each connection means.

11. The food cooking system according to claim 10, wherein each information unit includes a plurality of alternative variants of said set of cooking process data, each variant being related to a certain kind of cooking device in respect of the kind of heating means.

12. The food cooking system according to claim 10, wherein the library is provided with an identification means for identifying an external user downloading an information unit.

13. The food cooking system according to claim 10, wherein the library includes a downloading means for downloading food cooking information.

14. The food cooking system according to claim 10, wherein the library includes a computer readable medium storing said information units, wherein said computer readable medium is a non-volatile storage device.

15. A food cooking device including a plurality of heating means for heating a respective food item and control means arranged to individually control energy supply to each of the heating means, wherein the food cooking device includes a microprocessor with downloading means arranged to download a set of food cooking process data, and in that the control means is arranged to control the energy supply to a plurality of the heating means in response to said downloaded set of food cooking process data, characterized in that the microprocessor includes searching means for searching among a plurality of sets of cooking process data and selecting means for selecting one of said plurality of sets of food cooking process data for downloading in order to automatically prepare a meal for serving at the end of a process without any manual interference, and wherein the control means includes a control unit with a conductor arranged to be connected to the energy supply, which control unit is provided with a plurality of electrical connection means, each connection means being arranged to be connectable to a cooking pot for supply of electric energy to a respective cooking pot and in that the control unit is arranged to allow simultaneous supply of electric energy through said plurality of connection means, and in that the control unit is arranged to govern switching means related to each connection means.

* * * * *